United States Patent [19]

Kitazawa et al.

[11] 4,266,995

[45] May 12, 1981

[54] LIGHT WEIGHT PNEUMATIC TIRE HAVING A THIN SIDE WALL RUBBER

[75] Inventors: Yoichi Kitazawa, Kodaira; Takeshi Sato, Higashi-Yamato; Hisao Tsuji, Akigawa, all of Japan

[73] Assignee: Bridgestone Tire Company Limited, Kyobashi, Japan

[21] Appl. No.: 57,476

[22] Filed: Jul. 13, 1979

Related U.S. Application Data

[60] Continuation of Ser. No. 883,984, Mar. 6, 1978, abandoned, which is a division of Ser. No. 720,294, Sep. 3, 1976, Pat. No. 4,096,899.

[30] Foreign Application Priority Data

Sep. 18, 1975 [JP] Japan ............................. 50/112066

[51] Int. Cl.$^3$ .................... B29H 17/14; B29H 17/22
[52] U.S. Cl. ..................... 156/123 R; 152/353 R; 152/354 R; 156/132; 156/133
[58] Field of Search ........... 152/330 R, 352 R, 353 R, 152/354 R, 357 R, 362, 374; 156/123–133

[56] References Cited

U.S. PATENT DOCUMENTS

| | | | |
|---|---|---|---|
| 2,445,725 | 7/1948 | Walker | 152/374 |
| 3,050,098 | 8/1962 | Grote | 152/354 |
| 3,481,386 | 12/1969 | Menell et al. | 152/354 |
| 3,509,929 | 5/1970 | Delobelle | 152/354 |
| 3,703,203 | 11/1972 | Simpson | 152/354 |
| 3,841,375 | 10/1974 | Edwards | 152/355 |
| 3,849,045 | 11/1974 | Ohkawa et al. | 425/131.1 |
| 4,007,069 | 2/1977 | Takayanagi et al. | 156/123 R |
| 4,023,608 | 5/1977 | Meiss | 152/362 R |

*Primary Examiner*—John E. Kittle
*Attorney, Agent, or Firm*—Sughrue, Rothwell, Mion, Zinn and Macpeak

[57] ABSTRACT

A light weight pneumatic tire having a thin side wall rubber is disclosed. The thin side wall rubber has previously been squeezed on that region of the outer surface of an upper ply which corresponds to the side wall portion of the tire prior to the tire shaping step, and has a Shore A hardness after vulcanization of 40° to 55°, an excellent flex-cracking and weather resistant property. The upper ply is superimposed about at least a portion extending from a hump portion to a bead portion is composed of cords coated with a high resilient rubber. A tread rubber layer is extended across the thin side wall rubber layers and pressed and made integral therewith by stitching.

6 Claims, 8 Drawing Figures

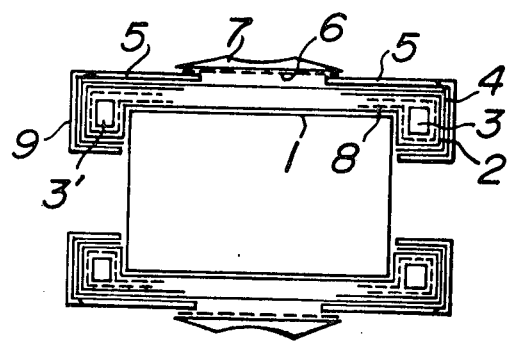
FIG._1
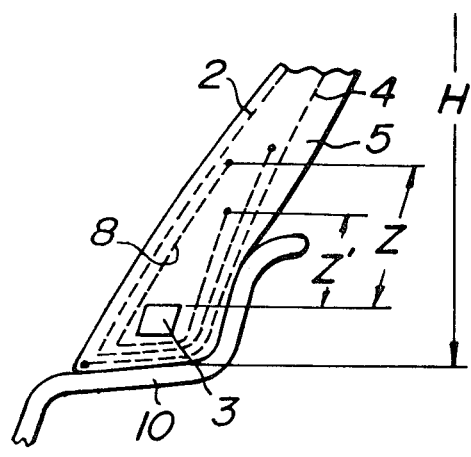
FIG._2
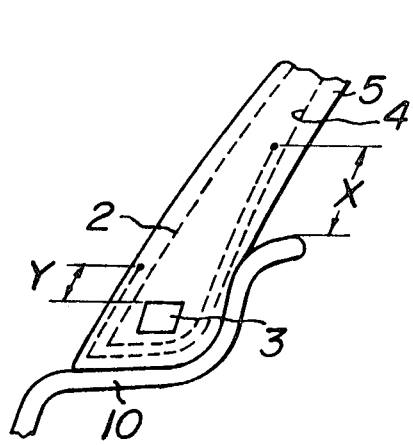
FIG._3

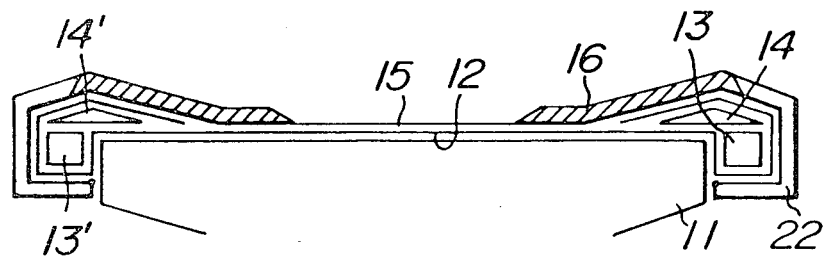
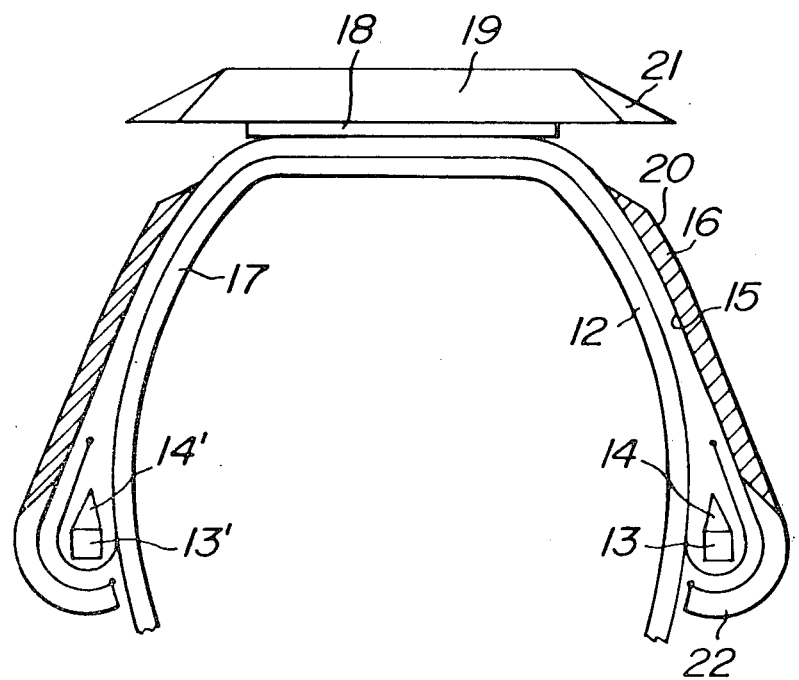

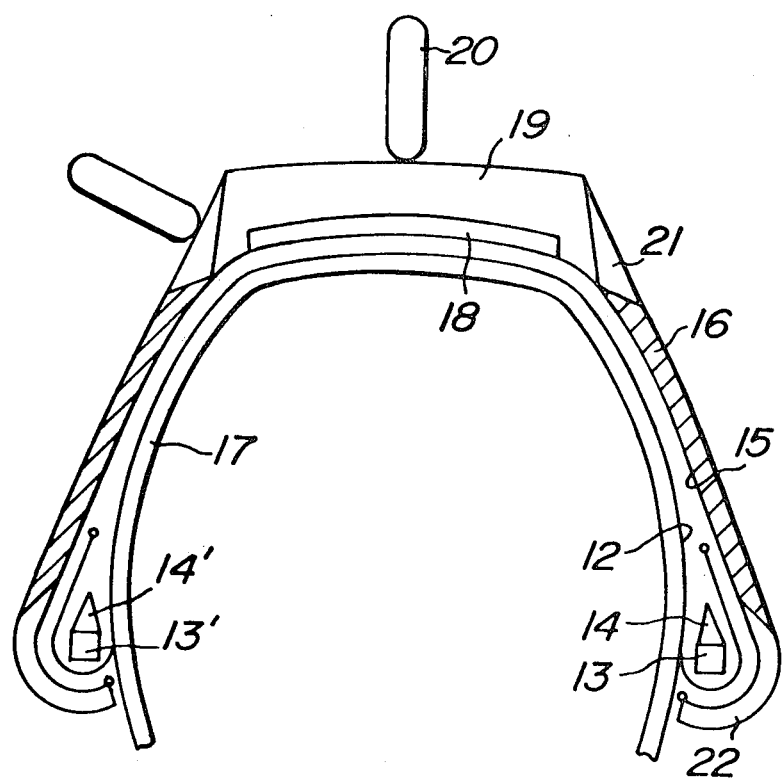

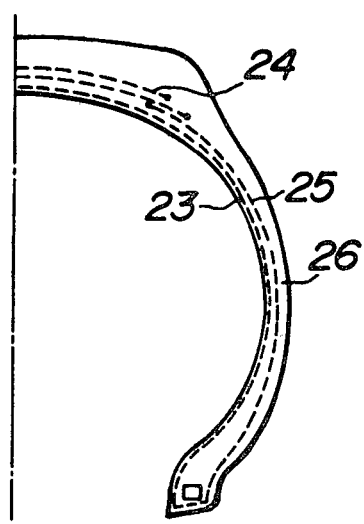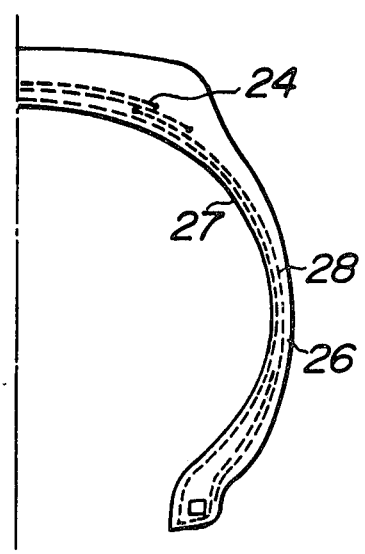

LIGHT WEIGHT PNEUMATIC TIRE HAVING A THIN SIDE WALL RUBBER

This is a continuation of application Ser. No. 883,984, filed Mar. 6, 1978, now abandoned, which is in turn a divisional of application Ser. No. 720,294, filed on Sept. 3, 1976 now U.S. Pat. No. 4,096,899, issued June 27, 1978.

This invention relates to light weight pneumatic tires and more particularly to a light weight pneumatic tire having a thin side wall rubber and a method of producing the same.

A pneumatic tire is mainly divided with respect to its carcass construction into a bias tire comprising rubberized carcass plies each containing a plurality of cords inclined with respect to the circumferential direction of the tire and oppositely inclined to the cords associated with the other carcass ply and into a radial tire comprising rubberized carcass plies each containing a plurality of cords disposed in radial planes or inclined at a very small angle from such radial plane.

The bias tire is produced by one step method comprising superimposing all of tire members about a former one upon the other in succession in substantially cylindrical shape so as to produce a green case, and deforming the green case in a shaping and vulcanizing metal mold into a toroidal shape and then effecting shaping and vulcanization of the tire.

The radial tire is produced by two step method comprising superimposing tire members exclusive of a belt and a tread rubber layer about a former one upon the other in succession in substantially cylindrical shape so as to produce a green case, deforming the green case into a toroidal shape, and superimposing the belt and the tread rubber layer about the torroidal green case. The reasons why the radial tire is required to be produced by the two step method are as follows. In the radial tire, the difference between the inclined cord angle of the carcass ply and the inclined cord angle of the belt reaches to up to 60° to 80°, while in the bias tire the difference between the inclined cord angle of the carcass ply and the inclined cord angle of the breaker is at most on the order of 10°. As a result, in the radial tire, if the belt and the tread rubber layer are superimposed about any other tire members on top of the former, the green case inclusive of the belt and the tread rubber layer could not be deformed into a toroidal shape.

As a result, the bias tire has the advantage that the use of the one step method makes it possible to produce the bias tire in a less expensive manner. On the other hand, the radial tire has the advantage that the characteristics thereof are superior to those of the bias tire, but has the disadvantage that the use of the two step method results in troublesome in production and increased cost of the tire.

The above mentioned advantageous effect of the one step method, however, has become ambiguous owing to the needs of the recent developed use of the tire.

That is, in the conventional one step method, a composite contour composed of a tread rubber layer and a pair of side wall rubber layers superimposed about each side of the tread rubber layer is extruded by means of a dual tuber into one integral body which is then applied onto a former. Then, one single operation is effected to the outer surface of rubber of the tire mainly consisting of the tread rubber layer and the side wall rubber layer to produce a green case. Such method of extruding different kinds of tread rubber layer and side wall rubber layer into one integral body which can reduce the number of steps and satisfy the different characteristics required by the tread rubber layer and the side wall rubber layer has heretofore been proposed and described, for example, in U.S. Pat. No. 3,849,045 and U.S. Pat. No. 2,445,725.

Recent significant development relating to pneumatic tire materials, particularly conspicuous improvement in road conditions results in that the thickness of the side wall rubber layer which has heretofore been required to be thick must be reduced as thin as possible for the purpose of obviating the disadvantage of heavy weight and excessive heat generation due to large thickness of the side wall rubber layer. As a result, a difference between the thickness of the side wall rubber layer and the thickness of the tread rubber layer becomes considerably large.

This makes formation of the composite contour by the extrusion process very difficult. In addition, the side wall rubber layer which has been reduced in thickness as described above is liable to be subjected to undulation produced due to centrifugal force during rotation of the former and stitching roll working, difficult in working and becomes irregular in thickness due to bad extrusion, thereby causing the tire to be non-uniform and unbalanced in construction.

Attempts have been made to abandon the method of extruding the tread rubber layer and the side wall rubber layer into one integral body and instead thereof to prebond separate contours formed by separately extruding respective tread rubber layer and side wall rubber layer with each other. In such attempts, however, undulations also occurred on the thin side wall rubber layer when it is stitched by means of a stitching roller.

Even in a prior art method of producing a radial tire in which a pair of side wall rubber layers are superimposed about a carcass ply disposed on a cylindrical former, these side wall rubber layers are required to be thin in thickness, and as a result, the above described problem was also occurred.

An object of the invention, therefore, is the provision of a light weight pneumatic tire which features and employs a novel side wall portion, which can be produced by one step or two step method in a high production efficiency, and which is light in weight and possessed of improved characteristics.

The reduction in weight of the pneumatic tire results in a high speed rotation of the tire, a decrease in heat generation which is accelerated under heavy load condition and also a decrease in resistance to rolling under improved road condition which can alleviate excessive protection of the carcass ply by the side wall rubber outer surface.

It is necessary to protect the carcass ply from external forces unavoidably subjected to the external surface of the side wall rubber when the tire makes slight contact with curb on the road. For this purpose, the thin rubber layer according to the invention is required to have a shore A hardness after vulcanization of 40° to 55°, an excellent flex-cracking and weather resistant property. In this case, the thickness of the thin rubber layer is required to be 0.5 mm to 3.0 mm, preferably 0.5 mm to 2.0 mm.

The above mentioned kind of thin side wall rubber is not suitably adhered under pressure to any other tire members on the former by means of a stitcher roll.

In accordance with the invention, use is made of an upper ply composed of a rubberized fabric containing a plurality of mutually parallel cords and extending at least from a hump portion to the bead portion of the tire. The upper ply is provided at that region of the outer surface thereof which corresponds to the side wall portion of the tire with a thin rubber layer formed of the above mentioned material, the thin rubber layer being previously squeezed on the above mentioned region of the side wall portion of the upper ply prior to its adherence to the main carcass ply in the step of producing the tire.

The upper ply may be composed of an outside turn-up portion of the main carcass ply, the upper end of the turn-up portion being terminated at a hump portion of the tire.

The upper ply may also be composed of a side ply superimposed about that portion of the main carcass ply which is located between the hump portion and the bead portion of the tire. In addition, the upper ply may be composed of an uppermost ply of a plurality of main carcass plies extending from one of a pair of bead portion through a crown portion of the tire to another bead portion. Each of these upper plies is composed of a rubberized ply containing a plurality of mutually parallel cords coated with rubber having an excellent resistance to heat, that is, having a high resilience.

The thin rubber layer may be squeezed on that region of the upper ply which corresponds to the side wall portion by any squeezing means, preferably by using calender rolls. In this case, the thickness of the thin rubber layer must suitably be selected to an estimated thickness by taking reduction in thickness which is produced when the tire is deformed into a toroidal-shape.

The invention may be applied to the one step method such that an extruded tread rubber layer and a breaker are superimposed about a former, prior to deformation thereof into a toroidal shape and the tread rubber layer is pressed by a stitcher roll upon the thin rubber layer which has previously been squeezed on the upper ply.

The invention may also be applied to the two step method such that, after deformation of the green case, a tread rubber layer having a Shore A hardness after vulcanization of 55° to 70° and an excellent abrasion resistant property and a belt reinforcing layer are superimposed about an inflated carcass ply and that the tread rubber layer composed of a center body portion and side edge portions made integral therewith by extrusion and formed of rubber which is the same as that of the rubber layer squeezed on the upper ply, is pressed by a stitcher roll upon the thin rubber layer which has previously been squeezed on the upper ply.

In both the one step method and the two step method, the cords of the upper ply are coated with rubber having an excellent heat resistant property and high resilience which is the same as rubber for coating the carcass ply. On the contrary, the thin rubber layer to be squeezed down on the upper ply is composed of rubber having an excellent flex-cracking resistant property, weather resistant property which causes the rubber not to change its quality even when it is exposed to wind, rain, ozone, ice and snow and resistance to cut failure which is sufficient to prevent damage to be occurred when the tire rides on the curb, for the purpose of forming a flexible side portion of the tire.

In order to make the thin rubber layer high in resistance to cut failure, it is indispensable to make the thickness of the thin rubber layer 0.5 mm to 3.0 mm, preferably 0.5 mm to 2.0 mm for the purpose of providing a tire which is light in weight and to make the Shore A hardness of the thin rubber layer 40° to 55°. If the Shore A hardness of the thin rubber layer is smaller than 40°, the resistance to cut failure of the thin rubber layer becomes insufficient, on the contrary, if the Shore A hardness of the thin rubber layer is larger than 55°, the flex-cracking resistant property of the thin rubber layer becomes small.

The invention will now be described in greater detail with reference to the accompanying drawings, wherein:

FIG. 1 is a cross-sectional view illustrating a method of producing a green case of a bias tire according to the invention;

FIG. 2 is a cross-sectional view showing one embodiment of a bead portion of the bias tire according to the invention;

FIG. 3 is a cross sectional view showing another embodiment of the bead portion of the bias tire according to the invention;

FIG. 4a is a cross-sectional view illustrating a method of producing a green case of a radial tire according to the invention;

FIG. 4b is a cross-sectional view showing a belt and a tread rubber layer located on top of a toroidal-green case of the radial tire shown in FIG. 4a;

FIG. 4c is a cross-sectional view illustrating stretching effected to the tread rubber layer only of the radial tire shown in FIG. 4b;

FIG. 5 is a cross-sectional view of one-half of a tire according to the invention showing a modified type of the upper ply therefore; and FIG. 6 is a cross-sectional view of one-half of a tire according to the invention showing another modified type of upper ply therefore.

In FIG. 1 is illustrated a method of producing a green case of a bias tire having a size of 6.45-13 2p according to the invention.

That is, about a cylindrical former 1 made of metal is superimposed a carcass ply 2 composed of a rubberized fabric containing a plurality of mutually parallel cords. A pair of bead cores 3, 3' are set on the cylindrical former 1 and each end of the carcass ply 2 is wound about the bead core 3 from the inside toward the outside thereof to form a turn-up portion. An upper ply 4 composed of a rubberized fabric containing a plurality of mutually parallel cords is superimposed about the carcass ply 2. Each end of the upper ply 4 is superimposed about the turn-up portion of the carcass ply 2 and wound about the bead core 3 from the outside toward the inside thereof.

A pair of thin rubber layers 5 each having an excellent flex-cracking and weather resistant property are previously squeezed on that region of the upper ply 4 which corresponds to the side wall portion of the tire by a separate step. The thin rubber layer 5 is made 2.0 mm in thickness and 40° to 55° in Shore A hardness after vulcanization. The thin rubber layer 5 is faced outwardly with respect to radial direction of the former.

The cords of the carcass ply 2 and upper ply 4 are angularly disposed with respect to the peripheral center line of the former 1 and oppositely inclined with each other to construct a bias carcass.

A breaker 6 and a tread rubber layer 7 having an excellent abrasion resistant property and a Shore A hardness after vulcanization of 55° to 75° are superimposed about the upper ply 4 in succession in a conventional manner. The tread rubber layer 7 is pressed upon the former 1 while rotating it by means of a stitcher roll (not shown). A green case thus obtained is removed from the former 1 and is subjected to conventional shaping and vulcanization steps.

Reference numeral 8 designates a flipper and 9 shows a rubber chafer which is prebonded to the thin rubber layer 5.

Both the carcass ply 2 and the upper ply 4 are composed of polyester cords of 1,500 d/2 whose ends are 52 per 5 cm for a finished tire. The flipper 8 is composed of nylon cords of 840 d/2 whose ends are 42 per 5 cm for the finished tire.

As shown in FIG. 2, a height Z of the upper end of an inside turn-up portion of the flipper 8 from the bead core 3 is 3.0 cm and a height Z' of the upper end of an outside turn-up portion of the flipper 8 from the bead core is 1.9 cm so as to locate these upper ends of the turn-up portions of the flipper 8 at positions having a difference in heights in a radial direction of the tire.

As shown in FIG. 3, the upper end of an outside turn-up portion of the carcass ply 2 is located at a position which is higher than the upper end of the flange of a rim 10 of the tire by X=2.5 cm. If the lower end of the upper ply 4 is terminated at the toe of the bead portion, a sufficiently high durability of the bead is obtained with a high shaping efficiency.

The heights Z, Z' of the upper ends of the turn-up portions of the flipper 8 shown in FIG. 2 may preferably be ½ to 1/5 times shorter than a height H of the inner surface of the tire in its inflated state measured from a reference line connecting the heel and heel of the bead portion of the tire united with the rim. In addition, it is preferable to make the difference between Z and Z' 0.5 to 2.5 cm.

In the embodiment shown in FIG. 3, the flipper 8 shown in FIGS. 1 and 2 is omitted and the upper ply 4 is wound about the toe of the bead portion from the outside toward the inside thereof to form a turn-up portion which is balanced with the outside turn-up portion of the main carcass ply 2.

In the embodiment shown in FIG. 3, let the height X of the upper end of the turn-up portion of the carcass ply 2 from the flange of the rim 10 be on the order of 2.5 cm, it is preferable to make the height Y of the upper end of the inside turn-up portion of the upper ply 4 from the bead core 3 on the order of about 0.5 cm. In the present embodiment, if the upper ply 4 is terminated at the heel or toe of the bead portion, resistance to wear of the bead portion becomes insufficient probably due to unbalance in rigidity of the tire under its loaded condition.

In the bias tire according to the invention described above with reference to FIGS. 1 to 3, the side wall rubber is composed of the thin rubber layer 5 which has previously been squeezed on the upper ply 4. As a result, the use of the thin rubber layer 5 has the advantage that it is possible to make the tire light in weight and prevent generation of heat and it is not necessary to extrude the side wall rubber together with the tread rubber layer through a dual tuber which has heretofore been used in practice.

If the side wall rubber together with the tread rubber layer are extruded through a dual tuber into a composite contour having an extremely thin thickness which is extrudable, undulation is produced in the case of stitching and the extruded product becomes irregular in thickness due to such extremely thin thickness, and as a result, characteristics of the tire become degraded. Finally, the use of the thin rubber layer 5 makes it possible to prevent such prior art disadvantage and effect stitching on the tread rubber layer only, thereby significantly shortening the press working time.

In FIGS. 4a, 4b and 4c is shown in cross-section a radial tire 165-14.2P constructed according to the principles of the invention.

About a cylindrical former 11 is superimposed a carcass ply 12 containing a plurality of mutually parallel cords disposed in parallel with the generatrix of the cylindrical former 11. A pair of bead cores 13, 13' and a pair of stiffner gums 14, 14' are set at each end of the carcass ply 12. Each end of the carcass ply 12 is wound about the bead core 13 from the inside toward the outside thereof. An upper ply 15 is superimposed about the carcass ply 12. Each end of the upper ply 15 is wound about the bead core 13 from the outside toward the inside thereof.

A thin rubber layer 16 having a thickness of 2.0 mm, an excellent flex-cracking and weather resistant property and a Shore A hardness after vulcanization of 40° to 55° has previously been squeezed on that region of the upper ply 15 which corresponds to the side wall portion of the tire.

The stiffner gums 14, 14' may previously be squeezed on a desired position of the carcass ply 12.

After the above mentioned first shaping step has been effected, the former 11 is reduced in diameter in a conventional manner and a green case obtained is removed from the former 11. Then, the green case is deformed into a toroidal shape with the aid of a bladder 17 as shown in FIG. 4b. Subsequently, a belt 18 and a tread rubber layer 19 are located on top of the upper ply 15 one upon the other in succession, the tread rubber layer 19 being possessed of an excellent abrasion resistant property and a Shore A hardness after vulcanization of 55° to 75°. Then, the tread rubber layer 19 is pressed down on the thin rubber layer 16 by means of a stitching roller 20 as shown by FIG. 4c.

The tread rubber layer 19 is provided at its both sides with side edge rubber portions 21 made integral with the tread rubber layer 19 by extrusion. The side edge rubber portion 21 may preferably be formed of rubber which is the same as that of the thin rubber layer 16 squeezed on the upper ply 15.

Reference numeral 22 designates a rubber chafer lap jointed with the thin rubber layer 16.

After the above mentioned second step has been effected, the assembly is heated under pressure in a vulcanizing metal mold in a conventional method to provide a radial tire.

Heretofore, it has been proposed to form a radial tire by extruding a side wall rubber by a separate step and by superimposing this side wall rubber about a former. On the contrary, in the present invention, a thin rubber layer is previously squeezed on that region of the upper ply which corresponds to the side wall portion, so that no stitching is required for the side wall portion. In the radial tire, the stitching step must be effected all over the outer surface of the tire. The use of the measures described according to the invention ensures limitation of the stitching step to the tread rubber layer only, thus resulting in a significant reduction in number of steps. In addition, since it is not necessary to subject the rubber of the side wall portion to the stitching step, undulation or irregular thickness due to bad extrusion is not produced. As a result, provision may be made of a tire which is uniform and balanced in construction and light in weight.

In the above mentioned respective respresentative embodiments of the bias tire and the radial tire according to the invention, the upper ply 4, 15 extends from one of bead cores 3, 13 to another bead core 3', 13'. Such construction of the upper ply 4, 15 is not always necessary.

In another embodiment shown in FIG. 5, an upper ply is composed of a high turn-up portion 25 of a carcass ply 23, the upper end of which is terminated at a position directly beneath a breaker or belt 24. In the present embodiment, the above mentioned thin rubber layer 26 may also previously be squeezed on the high turn-up portion 25 of the carcass ply 23 to obtain the same effect as the above mentioned effect.

In a further embodiment shown in FIG. 6, each end of a carcass ply 27 is wound about a bead core from the inside toward the outside thereof to form a turn-up portion whose upper end terminates at a position which is higher than a rim flange. In the present embodiment, use is made of a side ply 28 as an upper ply which extends from a position near the bead portion to a position directly beneath a breaker or belt 24. In the present embodiment, the above mentioned thin rubber layer 26 has previously been squeezed on the side ply 28 to obtain the same effect as that described with reference to FIGS. 1 to 4. The carcass ply 23, 27 may be of bias- or radial-laid ply.

As explained hereinbefore, the use of the measures of previously squeezing a side wall rubber on that region of the outer surface of an upper ply which corresponds to a side wall portion of a tire provides the important advantage that the side wall portion of the tire can be made to such a thin thickness that the side wall portion could no more withstand a conventional stitching or extrusion step applied thereto, that the tire becomes light in weight, that the tire provides a material increase in resistance to generation of heat, and that the tire may be formed in an extremely simple and efficient manner.

What is claimed is:

1. A method of producing a light weight pneumatic tire having a thin sidewall rubber, comprising: initially squeezing a thin sidewall rubber layer only onto opposite outer sidewall portions of an upper ply layer consisting of cord strips by means of calender rolls, said thin sidewall rubber layer having a thickness of 0.5 mm to 2.0 mm and a Shore A hardness after vulcanization of 40° to 55°, and thereafter forming the tire by winding at least one carcass ply layer having a width substantially corresponding to a distance between a pair of bead cores around a cylindrical former, positioning a pair of bead cores on said at least one carcass ply layer at axially opposite end portions of said former, superimposing said upper ply layer with the thin sidewall rubber layer squeezed thereon by calender rolls about regions extending from said bead cores to at least crown edges of the tire to cover said regions with said thin sidewall rubber layer on said former, and vulcanizing the thus assembled layers.

2. The method according to claim 1, wherein said upper ply layer is superimposed about the carcass ply layer in each region from the bead to the crown edge of the tire.

3. A method according to claim 1, wherein said thin sidewall rubber layer is squeezed onto each portion of the upper ply layer corresponding to both sidewalls of the tire, and said upper ply layer with thin sidewall rubber layer is superimposed about the carcass ply in a region between bead portions.

4. A method according to claim 1, wherein cords of said carcass ply layer are set angularly with respect to the peripheral center line of the cylindrical former, and said upper ply layer with the thin sidewall rubber layer is superimposed about the carcass ply so that the cords of said upper ply layer are oppositely inclined with respect to the cords of the carcass ply layer.

5. A method according to claim 1, wherein cords of said carcass ply layer are set such that they are substantially coincident with the peripheral center line of the cylindrical former, and said upper ply layer with the thin sidewall rubber layer is superimposed about the carcass ply layer so that the cords of said upper ply layer are substantially coincident with the cords of said carcass ply layer.

6. A method according to claim 5, further comprising extruding a tread rubber layer having sidewall rubber portions at both sides thereof, and superimposing said tread rubber layer about said superimposed upper ply layer.

* * * * *